United States Patent [19]

Hansen

[11] 4,169,088

[45] Sep. 25, 1979

[54] PROTECTIVE COATING AND METHOD OF APPLYING

[75] Inventor: Ronald P. Hansen, French's Forest, Australia

[73] Assignee: Ecologel Pty. Limited, French's Forest, Australia

[21] Appl. No.: 911,013

[22] Filed: May 30, 1978

[30] Foreign Application Priority Data

Feb. 20, 1978 [AU] Australia .............................. PD3450

[51] Int. Cl.$^2$ .................... C08L 39/04; B05D 3/02; B65B 33/00
[52] U.S. Cl. .......................... 260/29.6 WB; 52/515; 52/517; 252/383; 260/29.6 WA; 260/29.6 HN; 427/140; 427/154; 427/155; 427/156; 427/385 R; 427/385 C; 427/421; 427/429; 428/907; 428/911; 525/57
[58] Field of Search .................... 427/385 C, 445, 154, 427/155, 156, 140, 385 R, 429, 421; 260/895, 29.6 BM, 29.6 WA, 29.6 WB, 29.6 MM, 29.6 HN; 106/2, 3, 11, 32.5; 35/61, 66; 252/383; 428/907, 911; 52/515, 516, 517

[56] References Cited

U.S. PATENT DOCUMENTS

| | | | |
|---|---|---|---|
| 2,940,950 | 6/1960 | Gusman | 260/895 X |
| 3,061,569 | 10/1962 | Stoner et al. | 260/895 X |
| 3,574,153 | 4/1971 | Sirota | 260/895 X |
| 3,582,257 | 6/1971 | Hirshfeld et al. | 427/390 E X |
| 3,821,146 | 6/1974 | Drelich et al. | 260/29.6 MM |
| 3,930,073 | 12/1975 | Drelich et al. | 427/341 |
| 3,947,397 | 3/1976 | Schuster et al. | 427/385 C X |
| 4,005,033 | 1/1977 | Georgeau et al. | 260/29.6 WA X |
| 4,017,662 | 4/1977 | Gehman et al. | 427/385 C X |

*Primary Examiner*—Michael F. Esposito
*Assistant Examiner*—Thurman K. Page
*Attorney, Agent, or Firm*—Ladas, Parry, Von Gehr, Goldsmith & Deschamps

[57] ABSTRACT

The invention is directed towards an improved sealing solution and in particular anti-graffiti solutions. The solution is formed by combining a suitable polyvinyl alcohol with a solution or emulsion of acrylic resin to form a partially cross-linked shared polyvinyl alcohol-/acrylic resin, catalyzed by exposure to heat and/or light. The properties of the solution are enhanced by the addition of a zinc complex solution containing zinc tetramine and/or an aldehyde donor such as formaldehyde or glyoxal.

7 Claims, No Drawings

PROTECTIVE COATING AND METHOD OF APPLYING

This invention relates to improved sealing solutions and in particular to solutions adapted for application to surfaces for the prevention of defacement by undesirable coatings and the amelioration of the effects of weathering.

The application of graffiti and other undesirable words, pictures and slogans to public buildings, memorials, sculptures and the like has become a growing problem and in the United States measures taken to control or rectify the graffiti cost in excess of six hundred million dollars ($600,000,000) annually. The most common method of applying graffiti is from an aerosol spray pack can, however it has been found that markings caused by felt tip pens are the most difficult to remove.

Conventional methods of removal of graffiti include sand blasting, which removes a significant portion of the substrate and usually causes it to become more porous. This porosity then in turn accelerates damage caused by weathering. Alternatively, commercial solvents have proved unsatisfactory particularly if the graffiti has had a chance to harden. The severity of the damage is related to the depth of penetration of the marker substance especially into unpainted porous substrates such as brick, stone, concrete etc. Removal of stains from such surfaces is extremely difficult and costly and frequently the act of cleaning off an offensive slogan may itself cause considerable physical damage. Use of solvents may worsen the problem by carrying the stain into the adjacent unmarked areas of the surface.

Consequently there has arisen a need for the protective coating of objects that may be the target of graffiti vandals. Such coatings are well known and may be generally classified as urethanes, a dimethyl silicone and a styrene acrylonitrile terpolymer. Many of the solvents used in paints and dye markers will penetrate such films readily—for example silicones are usable only against water solvent paints or emulsions, and are ineffective against dyes or paints in aromatic hydrocarbon solvents or oils. Also, protection thus created may produce a high gloss, darkening of the substrate or other undesired characteristics.

An object of the present invention is to provide a coating solution which avoids the disadvantages of previously known protective coatings at a much reduced cost. The present invention is a paint-repellant synthetic terpolymer resin complex suitable for application to most surfaces. It forms an inert colorless film which is substantially invisible, resistant to sunlight and prevents permanent staining by almost all substances commonly used in graffiti defacement.

This invention utilises a film-forming material, polyvinyl alcohol, which is extremely resistant to nearly all hydrocarbon solvents, but hitherto has been unsuitable for such a use because of low adhesion to building surfaces and poor weather resistance.

By combining a suitable solution of polyvinyl alcohol in a complex shared copolymer form with a weather-resistant solution or emulsion of acrylic resin it has been found that a surface protective film is produced in situ on the building substrate having the following properties:

1. Good weather resistance and durability.
2. Resistance to penetration by nearly all paints, dyes, marker fluids, inks and other substances commonly used by vandals and political sloganeers.
3. An almost invisible finish with very low or nil gloss.
4. Low cost and simple to manufacture.
5. Enables easy and effective cleaning of subsequently defaced surfaces, without damage to the substrate thus protected.
6. Non-yellowing on outdoor exposure.

In general terms the chemical reactions utilised in this invention are the following:

REACTION A

The interaction of the carboxyl groups of the acrylic resin with the hydroxyl groups of the polyvinyl alcohol to form a shared co-polymer system, cross-linked in a manner illustrated below:

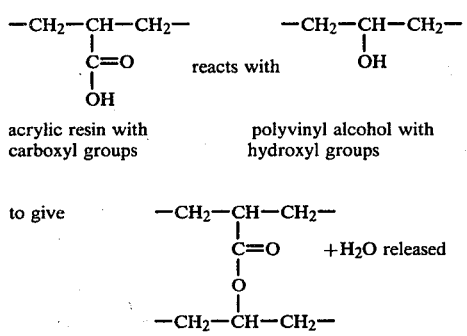

partially cross-linked shared pva/acrylic.

The reaction is catalysed on exposure to light and/or heat.

The end compound is resistant to weathering and ultraviolet light, as well as the solvents used in graffiti defacement compounds mentioned above. Such a resin thus meets the requirements listed above and comprises the invention in its broadest form. When cured, the film may be easily cleaned with common cleaning agents such as methylated spirits or toluene.

It has been found, however, that reaction A above proceeds quite slowly at normal ambient conditions. To provide early weather resistance, improved adhesion to substrates and earlier resistance to certain solvents, further reactions are introduced by the addition to the solution during manufacture of certain materials as follows:

To the solution/emulsion of acrylic resin and polyvinyl alcohol is added a zinc complex solution containing zinc tetramine. This is added as a 1% to 10% solution in ammoniacal water that has been made up separately. Alternatively, the zinc complex may be added to a separate solution of the pva which is then blended with the solution/emulsion of acrylic resin. No chemical reaction takes place at this stage due to the buffering action of an ammonia in the zinc tetramine solution.

Also an aldehyde donor, such as formaldehyde or glyoxal may be added to the solution system in one variation of the present invention to reduce the solubility of the pva during initial drying and curing by covering a proportion of the hydroxyl groups to form formal derivatives. Again, the reaction is inhibited during storage of the mixed fluids due to the buffering action of the ammonia present. It has been found that the reactants are stable in storage at temperatures between 5° C. and 40° C.

Thus, on application to a surface and exposure to the atmosphere, the complex dries and ammonia is quickly lost by evaporation causing the system to become acidic. Reactions (B) and (C) below then occur separately, involving portions of each of the carboxyl and hydroxyl groups present.

REACTION B

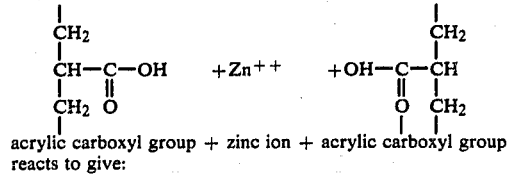

acrylic carboxyl group + zinc ion + acrylic carboxyl group reacts to give:

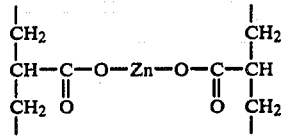

a zinc cross-linked acrylic

REACTION C

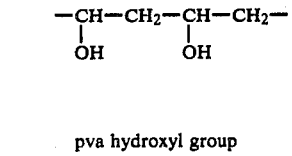

pva hydroxyl group reacts to give:

—CH—CH$_2$—CH—CH$_2$—
　　|　　　　　|
　OH　　CH$_2$　O
　　　　　　\_\_\_\_| polyvinyl formal

Reaction C provides interim weather resistance—the hydroxyl groups lose water to form rings thus reducing hydrolysability.

It has been found that a further cross linking also occurs to some degree between the acrylic/carboxyl groups and the pva/hydroxyl groups via the zinc ions. This may be represented as follows:

REACTION D

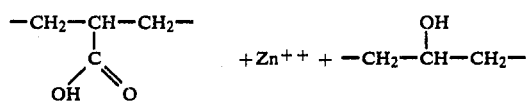

acrylic/carboxyl　　zinc ion　　pva/hydroxyl react to give

a zinc cross linked pva/acrylic copolymer resin.

The final form of the dried solution incorporating the bonds discussed above may be schematically depicted as follows:

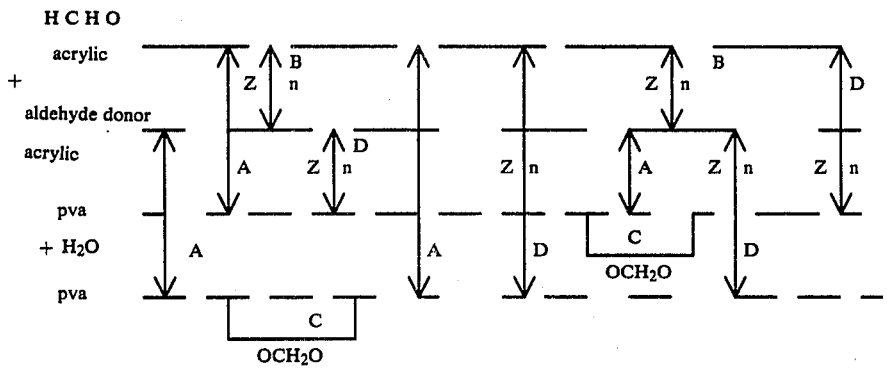

The invention requires the following reactants. The acrylic resin has a pure methylmethacrylate base, and a degree of carboxylation between 1.5% and 10%. Preferably the resin also has a glass transition temperature of at least 20° C. For low temperature ambient conditions and/or high humidity, the lower proportion of carboxyl radical in the acrylic is favoured, as this gives better early weather resistance. The higher degree of carboxylation allows more complete cross linking of the pva/acrylic complex thus improving the degree of solvent resistance, however, this is possible only in warmer and drier ambient conditions.

The acrylic resin should comprise more than 55% of the total solids of the formulation and be prepared in the form of a water solution or as an emulsion in water. The total non-volatiles should not be more than 35% of the complete formulation, and be prepared as a water solution or emulsion for effective penetration and sealing of the substrate. A formulation suitable for spraying onto walls with common spraying equipment requires to be of a viscosity less than about 500 cps—this is the practical limiting factor on total non-volatile content of the formulation. The concentration of the solution may be reduced if the viscosity is higher than this figure.

The quantity of pva should be such that the number of hydroxyl groups present therein should be between 5% and more than 50% of the number of carboxyl groups present in the acrylic.

The quantity of zinc ions in this zinc complex solution should be in the range from 10% to 50% of the mass of the carboxyl groups present. The zinc ion can only react with the carboxyl groups in the presence of the water during initial drying after loss of ammonia, and in practice the reaction only proceeds to partial completion leaving further carboxyl radicals available for reaction with the hydroxyl groups of the pva over a longer period.

The formaldehyde reaction with the hydroxyl groups of the pva likewise only proceeds to partial completion during initial drying and loss of ammonia. Thereafter, as the remaining formaldehyde is lost by evaporation, the balance of the hydroxyl groups become available for crosslinking with the acrylic/carboxyl groups.

The mass quantity of aldehyde groups in the system should be in the range of 20% to 50% of the quantity of hydroxyl groups present from the polyvinyl alcohol.

A better understanding of my invention will be gained from the following examples:

EXAMPLE 1

In ambient temperatures of 18° C. or more and relative humidity of below 60% an acrylic of 10% carboxylation and the pva of 86% hydroxylation have been found to cure well together. [However, these compounds will not satisfactorily perform at 5° C. and 90% relative humidity as this percentage of carboxylation and hydroxylation is too high—See example 2].

Sixteen kilograms of CARBOSET 525 brand water-soluble resin (a product of the Goodrich group) having a degree of carboxylation of 10% is dissolved in 120 liters of water with approximately three liters of 34% ammonia solution to assist the acrylic to dissolve. When completely dissolved, fourteen kilograms of GOHENSOL GL-05 brand polyvinyl alcohol (87% hydrolysed) is dissolved into the acrylic solution.

Three liters of a zinc tetramine complex, containing 6.2% of zinc ion, is diluted with 20 liters of water, and slowly added to the solution of the acrylic and pva using a high speed disperser appliance.

One liter of a 30% formaldehyde solution is also stirred into the above solution, and water added to bring total volume to 200 liters.

Approximately 100 CC of a 5% sulphuric acid solution is also stirred into the above to ensure that when the ammonia evaporates, the drying solution becomes acid.

The above solution is then ready for application, and can be applied to the substrate to be coated, which may be brick, concrete or similar building material, to complete saturation using a brush or airless spray to avoid frothing. Coverage required for saturation varies from 100 to 400 mls per square meter, depending on the porosity of the substrate.

Prior to coating, the substrate should be cleaned of all stains, dust, and foreign matter which may otherwise be trapped by the applied film. Care is necessary to avoid streaks or runs of excessive thickness, which are significantly slower to dry and harden and appear as visible streaks on an otherwise uniform and substantially invisible surface.

The surface develops a resistance to graffiti within two days and is fully cured within 21 days. It is expected the film will have a life of 3 to 6 years in outdoor conditions. Upon application of graffiti, the removal of same requires use of a solvent which will dissolve the particular stains or defacement material. In most cases methylated spirits or toluene is suitable. This is applied with a stiff brush, loosening and lifting the stain, which is then flushed away immediately with copious water flow.

In extreme cases of defacement the protective film may be regarded as a sacrificial membrane. It may be removed by scrubbing with the above solvents alternated with caustic soda or ammonia solution, and washed away with water. The film is usually removed with such an operation together with the defacement which is confined to it. Continued protection requires of course renewal of the film.

EXAMPLE 2

Into 20 liters of water heated to 95° C., is dissolved 2.6 kgm of Denka Poval K-05, a polyvinyl alcohol manufactured by the Denki Kagaku Kogyo Kabushiki group of Japan, being 98.5 to 99.9% hydrolysed. When all dissolved, and cooled to less than 30° C., the following is stirred in—2.6 liters of 34% formaldehyde, 600 grams of glyoxal (an aldehyde donor) 5 kgm of Syloid No. 74 (colloidal silica anti-gloss flatting agent made by the W. R. Grace Chemical group), 2.6 kgm of a zinc tetramine solution containing 6.2% $Zn^{++}$ ion, and 20 kgm of diethylene glycol monobutyl ether (=Butyl Carbitol, made by the Union Carbide group). The last named aids coalescence of the acrylic emulsion at low temperatures.

Into the above system is stirred 80 kgm of acrylic resin emulsion type 63-218, made by the Australian Chemical Holdings group, and having a solids content of approximately 40%, glass transition temperature around 45° C., and carboxylation degree of approximately 2%, plus a further 66 liters of water.

The above solution is applied similarly to the formulation of example 1, above. The applied film will cure to a graffiti-resistant condition within 24 hours at temperatures as low as 5° C. and relative humidities as high as 75%.

The procedure for removal of graffiti is as per 25–26 above. Again, the surface should be re-treated with the protective film after each occasion for removal of graffiti, by application of fresh protective material.

I claim:

1. A sealing solution for application to surfaces to protect same from defacement and deterioration, said solution comprising a resin formed by combining:
   (1) polyvinyl alcohol resin having:
       (a) a molecular weight from 8000 to 115,000 and
       (b) a degree of hydrolysis of 84–98%, with
   (2) an acrylic resin having:
       (a) substantially pure methyl-methylacrylic base, and
       (b) a carboxylation degree of 1.5 to 10% the proportion of pva to acrylic being such that the number of hydroxyl groups available from the pva is 5–50% of the number of carboxyl groups present, and
   (3) a zinc tetramine complex such that the quantity of zinc ions in the solution is in the range of 20–50% of the mass of carboxyl groups.

2. A sealing solution as claimed in claim 1 wherein the solution is prepared as a water solution or water emulsion having a viscosity of less than 500 cpa.

3. A sealing solution as claimed in claim 1 wherein an aldehyde donor is added to the solution.

4. A sealing solution as claimed in claim 1 wherein sufficient acid is added to ensure that on drying and evaporation of NH₃ the solution becomes acidic.

5. A sealing solution as claimed in claim 1 wherein the acrylic resin is greater than 55% of the total solids.

6. A sealing solution as claimed in claim 1 wherein total non-volatiles are less than 35% of the total solution.

7. A method of protecting surfaces by application of the solution as claimed in claim 9.

* * * * *